(12) United States Patent
Lemmon et al.

(10) Patent No.: US 6,807,609 B1
(45) Date of Patent: *Oct. 19, 2004

(54) INTERLEAVING READ AND WRITE OPERATIONS ON A BUS AND MINIMIZING BUFFERING ON A MEMORY MODULE IN A COMPUTER SYSTEM

(75) Inventors: Paul J. Lemmon, West Townsend, MA (US); Raj Ramanujan, Leominster, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/067,262

(22) Filed: May 25, 1993

Related U.S. Application Data

(63) Continuation of application No. 07/445,994, filed on Dec. 4, 1989, now abandoned.

(51) Int. Cl.[7] .............................................. G06F 13/28
(52) U.S. Cl. ........................ 711/150; 711/157; 711/168
(58) Field of Search .................. 364/200 MS, 900 MS; 395/400 MS, 425 MS; 711/150, 157, 168

(56) References Cited

U.S. PATENT DOCUMENTS

| | | | |
|---|---|---|---|
| 3,237,169 A | | 2/1966 | Hartwig et al. ........... 340/172.5 |
| 4,057,846 A | | 11/1977 | Cockerill et al. ............ 364/200 |
| 4,131,940 A | * | 12/1978 | Moyer ......................... 395/250 |
| 4,149,242 A | | 4/1979 | Pirz ............................. 364/200 |
| 4,287,577 A | * | 9/1981 | Deal, Jr. ...................... 365/233 |
| 4,366,539 A | * | 12/1982 | Johnson et al. .............. 364/200 |
| 4,371,929 A | | 2/1983 | Brann et al. ................. 364/200 |
| 4,378,589 A | | 3/1983 | Finnegan ..................... 364/200 |
| 4,382,279 A | | 5/1983 | Ugon .......................... 364/200 |
| 4,399,507 A | | 8/1983 | Cosgrove et al. ........... 364/200 |
| 4,451,880 A | * | 5/1984 | Johnson et al. .............. 395/425 |
| 4,456,965 A | | 6/1984 | Graber et al. ............... 364/900 |
| 4,462,072 A | | 7/1984 | Tague et al. ................. 364/200 |
| 4,558,429 A | * | 12/1985 | Barlow et al. .............. 395/425 |
| 4,594,682 A | | 6/1986 | Drimak ....................... 364/900 |
| 4,688,168 A | * | 8/1987 | Gudaitis et al. ............. 395/325 |
| 4,688,188 A | * | 8/1987 | Washington ................. 395/250 |
| 4,805,098 A | * | 2/1989 | Mills, Jr. et al. ............ 395/250 |
| 4,995,041 A | * | 2/1991 | Hetherington et al. ....... 395/425 |
| 5,019,965 A | * | 5/1991 | Webb, Jr. et al. ............ 395/425 |
| 5,043,874 A | * | 8/1991 | Gagliardo et al. ........... 395/425 |
| 5,051,889 A | * | 9/1991 | Fung et al. .................. 395/425 |
| 5,123,095 A | * | 6/1992 | Papadopoulos et al. ..... 395/375 |
| 5,155,854 A | * | 10/1992 | Flynn et al. ................. 395/725 |
| 5,179,680 A | * | 1/1993 | Colwell et al. .............. 395/425 |
| 5,197,145 A | * | 3/1993 | Kitamura et al. ............ 395/425 |
| 5,276,848 A | * | 1/1994 | Gallagher et al. ........... 395/425 |
| 5,307,506 A | * | 4/1994 | Colwell et al. .............. 395/325 |

* cited by examiner

Primary Examiner—Reba I. Elmore

(57) ABSTRACT

A computer system is adapted to transfer write data from a central processing unit to one of a plurality of memory modules in a memory array by transferring a block of write data to a memory control logic device. The memory control logic device transfers the block of data in a plurality of data bursts interspaced by a preselected number of bus cycles. During the interspaced preselected number of bus cycles, the memory control logic device sends pending read commands to an available memory module thereby overlapping read and write operations on the memory bus, thus, lowering memory read latency.

59 Claims, 7 Drawing Sheets

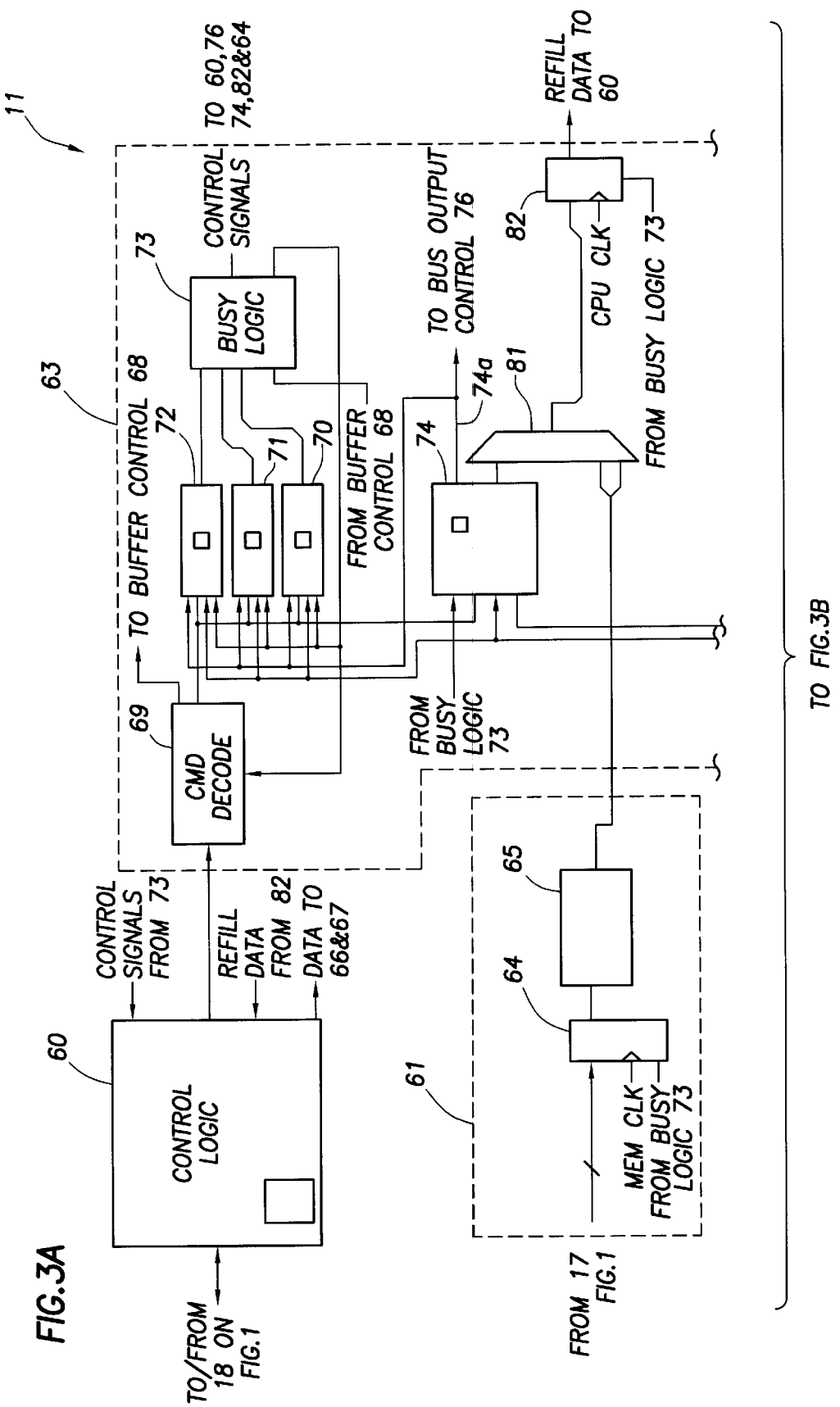

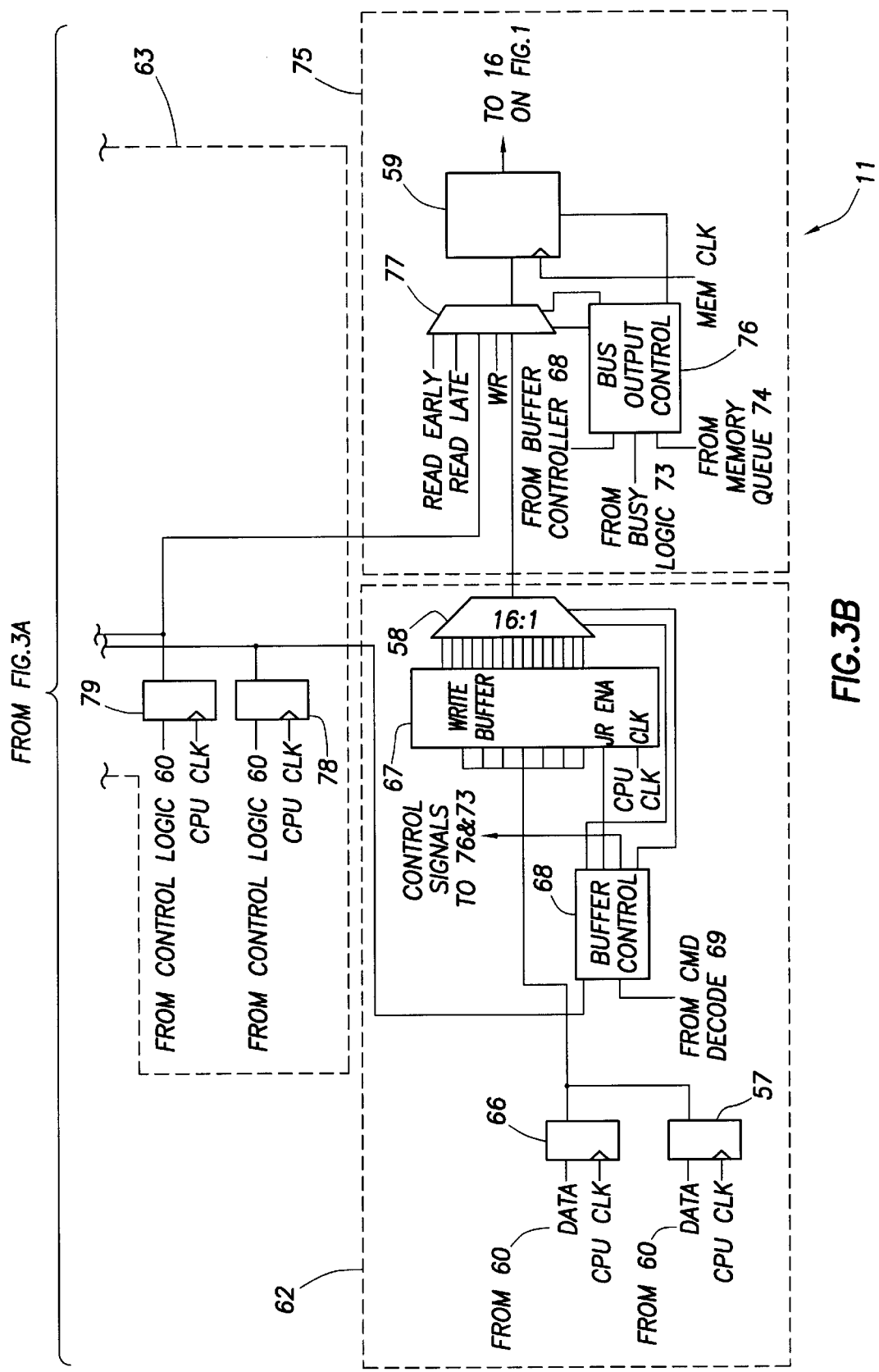

| CONTROL LOGIC | | | |
|---|---|---|---|
| COUNTER | WR ACC. | SEL <3:0> | ENA |
| 00 | 0 | 0 | 1 |
| 01 | 0 | 1 | 1 |
| 02 | 0 | 2 | 1 |
| 03 | 0 | 3 | 1 |
| 04 | 0 | 4 | 1 |
| 05 | 0 | 5 | 1 |
| 06 | 0 | 6 | 1 |
| 07 | 0 | 7 | 1 |
| 08 | 0 | X | 0 |
| 09 | 0 | X | 0 |
| 0A | 0 | X | 0 |
| 0B | 0 | X | 0 |
| 0C | 0 | 8 | 1 |
| 0D | 0 | 9 | 1 |
| 0E | 0 | A | 1 |
| 0F | 0 | B | 1 |
| 10 | 0 | C | 1 |
| 11 | 0 | D | 1 |
| 12 | 0 | E | 1 |
| 13 | 0 | F | 1 |
| 14 | 0 | X | 0 |
| 15 | 0 | X | 0 |
| 16 | 0 | X | 0 |
| 17 | 0 | X | 0 |
| 18 | 0 | X | 0 |
| 19 | 0 | X | 0 |
| 1A | 0 | X | 0 |
| 1B | 0 | X | 0 |
| 1C | 0 | X | 0 |
| 1D | 0 | X | 0 |
| 1E | X | X | 0 |
| 1F | X | X | 0 |

| CONTROL LOGIC | | | |
|---|---|---|---|
| COUNTER | WR ACC. | SEL <3:0> | ENA |
| 00 | 1 | 0 | 1 |
| 01 | 1 | 1 | 1 |
| 02 | 1 | 2 | 1 |
| 03 | 1 | 3 | 1 |
| 04 | 1 | 4 | 1 |
| 05 | 1 | 5 | 1 |
| 06 | 1 | 6 | 1 |
| 07 | 1 | 7 | 1 |
| 08 | 1 | X | 0 |
| 09 | 1 | X | 0 |
| 0A | 1 | X | 0 |
| 0B | 1 | X | 0 |
| 0C | 1 | X | 0 |
| 0D | 1 | 8 | 1 |
| 0E | 1 | 9 | 1 |
| 0F | 1 | A | 1 |
| 10 | 1 | B | 1 |
| 11 | 1 | C | 1 |
| 12 | 1 | D | 1 |
| 13 | 1 | E | 1 |
| 14 | 1 | F | 1 |
| 15 | 1 | X | 0 |
| 16 | 1 | X | 0 |
| 17 | 1 | X | 0 |
| 18 | 1 | X | 0 |
| 19 | 1 | X | 0 |
| 1A | 1 | X | 0 |
| 1B | 1 | X | 0 |
| 1C | 1 | X | 0 |
| 1D | 1 | X | 0 |
| 1E | X | X | 0 |
| 1F | X | X | 0 |

| CONTROL LOGIC | | | |
|---|---|---|---|
| COUNTER | WR ACC. | SEL <3:0> | ENA |
| 00 | 2 | 0 | 1 |
| 01 | 2 | 1 | 1 |
| 02 | 2 | 2 | 1 |
| 03 | 2 | 3 | 1 |
| 04 | 2 | 4 | 1 |
| 05 | 2 | 5 | 1 |
| 06 | 2 | 6 | 1 |
| 07 | 2 | 7 | 1 |
| 08 | 2 | X | 0 |
| 09 | 2 | X | 0 |
| 0A | 2 | X | 0 |
| 0B | 2 | X | 0 |
| 0C | 2 | X | 0 |
| 0D | 2 | X | 0 |
| 0E | 2 | 8 | 1 |
| 0F | 2 | 9 | 1 |
| 10 | 2 | A | 1 |
| 11 | 2 | B | 1 |
| 12 | 2 | C | 1 |
| 13 | 2 | D | 1 |
| 14 | 2 | E | 1 |
| 15 | 2 | F | 1 |
| 16 | 2 | X | 0 |
| 17 | 2 | X | 0 |
| 18 | 2 | X | 0 |
| 19 | 2 | X | 0 |
| 1A | 2 | X | 0 |
| 1B | 2 | X | 0 |
| 1C | 2 | X | 0 |
| 1D | 2 | X | 0 |
| 1E | X | X | 0 |
| 1F | X | X | 0 |

| CONTROL LOGIC | | | |
|---|---|---|---|
| COUNTER | WR ACC. | SEL <3:0> | ENA |
| 00 | 3 | 0 | 1 |
| 01 | 3 | 1 | 1 |
| 02 | 3 | 2 | 1 |
| 03 | 3 | 3 | 1 |
| 04 | 3 | 4 | 1 |
| 05 | 3 | 5 | 1 |
| 06 | 3 | 6 | 1 |
| 07 | 3 | 7 | 1 |
| 08 | 3 | X | 0 |
| 09 | 3 | X | 0 |
| 0A | 3 | X | 0 |
| 0B | 3 | X | 0 |
| 0C | 3 | X | 0 |
| 0D | 3 | X | 0 |
| 0E | 3 | X | 0 |
| 0F | 3 | 8 | 1 |
| 10 | 3 | 9 | 1 |
| 11 | 3 | A | 1 |
| 12 | 3 | B | 1 |
| 13 | 3 | C | 1 |
| 14 | 3 | D | 1 |
| 15 | 3 | E | 1 |
| 16 | 3 | F | 1 |
| 17 | 3 | X | 0 |
| 18 | 3 | X | 0 |
| 19 | 3 | X | 0 |
| 1A | 3 | X | 0 |
| 1B | 3 | X | 0 |
| 1C | 3 | X | 0 |
| 1D | 3 | X | 0 |
| 1E | X | X | 0 |
| 1F | X | X | 0 |

FIG.5

INTERLEAVING READ AND WRITE OPERATIONS ON A BUS AND MINIMIZING BUFFERING ON A MEMORY MODULE IN A COMPUTER SYSTEM

This is a continuation of application Ser. No. 07/445,994 filed Dec. 4, 1989 now abandoned.

FIELD OF THE INVENTION

This invention relates to a computer system and, more particularly, to a computer system which provides overlapping of read and write operations on a bus.

BACKGROUND OF THE INVENTION

High performance computer systems typically comprise a plurality of buses to transfer data between elements in the system. For example, a central processing unit (hereinafter "CPU") may conduct data transfers to a memory array through intermediate control logic. In one configuration, there may be two bus arrangements—one which couples the CPU to the control logic and one which couples the memory array to the control logic.

The CPU reads or writes memory through the control logic by issuing the appropriate command with address and other information to the control logic and allowing the control logic to perform the requested task. In such a system, the CPU is then free to perform computational tasks instead of waiting for data to be fetched from memory. This is particularly true when a CPU issues a write to memory. In the prior art system, the CPU issues a write command and sends a block of data to the control logic for transfer to the memory array. At this point, the CPU is finished with the write operation. The data transferred to the control logic must then be written to the memory array.

In high performance computer systems, the memory modules which comprise the memory array cannot store data as fast as the control logic can deliver it across the bus. This speed constraint is generally attributable to the cycle time of the random access memory (hereinafter "RAM") which comprises the memory on the memory modules. The cycle times of such devices are slow compared with the cycle time of the bus on which the control logic transfers the data to memory.

The prior art has addressed this problem by providing a buffer on a memory module that is large enough to hold a typical data block transferred from the control logic. This solution prevents tying up the bus minimizing any waste of bus bandwidth. The memory module writes the data stored in its buffer to its RAM at its own rate. The memory module, however, cannot be written to for a fixed period of time until its buffer is emptied.

While the prior art provides an adequate method for writing data to memory, there is a need for advancement. In particular, in a high performance computer system, a major bottleneck to processing speed is bus transfers. Thus, it is imperative to minimize bus transfers and also minimize the complexity of memory arrays to improve processing speed.

SUMMARY OF THE INVENTION

Accordingly, the present invention transfers write data from a CPU to a memory module in a plurality of data bursts interspaced by a preselected number of bus cycles which the memory modules use to absorb the issued data burst thereby reducing the buffer requirements of the memory module. The present invention utilizes the interspaced bus cycles to send pending read commands to another memory module to interleave read and write operations to thereby lower memory read latency and optimize the available bandwidth on the bus.

Generally, the present invention comprises a CPU coupled to a memory control logic device. The memory control logic device is also coupled to a memory array. The memory control logic device facilitates data transfers between the CPU and the memory array.

The present invention overcomes the disparity in speed between the cycle time of the bus coupling the memory array to the memory control logic device and the write latency of the memory module while reducing the buffer requirements of the memory module. The present invention implements a write to memory by first storing a data block received from a CPU in the memory control logic device. When the selected memory module, i.e., the memory module to which the write command is directed, becomes available, the memory control logic device transmits a block of data in a plurality of data bursts on the memory bus. The first data burst comprises a write command and a portion of the data block received from the CPU. The memory module latches this data in a latch and then transfers the data into its RAM. During this time when the memory module is transferring data from its latch to its RAM, the memory control logic device pauses a preselected amount of time in between each data burst to allow for the transfer of data from the latch to RAM and avoid the need for additional buffering on the memory module. The remaining portions of the block of data are transmitted from the memory control logic device to the selected memory module when the preselected amount of time has expired. The memory module again latches this data in its latch and transfers the data to its RAM.

The present invention utilizes the preselected amount of time between the plurality of data bursts to perform pending read operations with other memory modules. To accomplish this, the memory control logic device maintains a queue of pending read commands which it checks during the pause time. If there is a pending read to a nonselected memory module, i.e., a memory module not involved in the suspended write transaction, the memory control logic device transmits the read command to the selected memory module. By interleaving a read command in the preselected amount of pause time, the present invention reduces overall memory read latency and optimizes the available memory and bus bandwidth.

BRIEF DESCRIPTION OF THE DRAWINGS

FIG. 3 is a block diagram of memory control logic.

FIG. 5 is a state table illustrating the operation of the buffer control logic.

DETAILED DESCRIPTION

Figure 1:
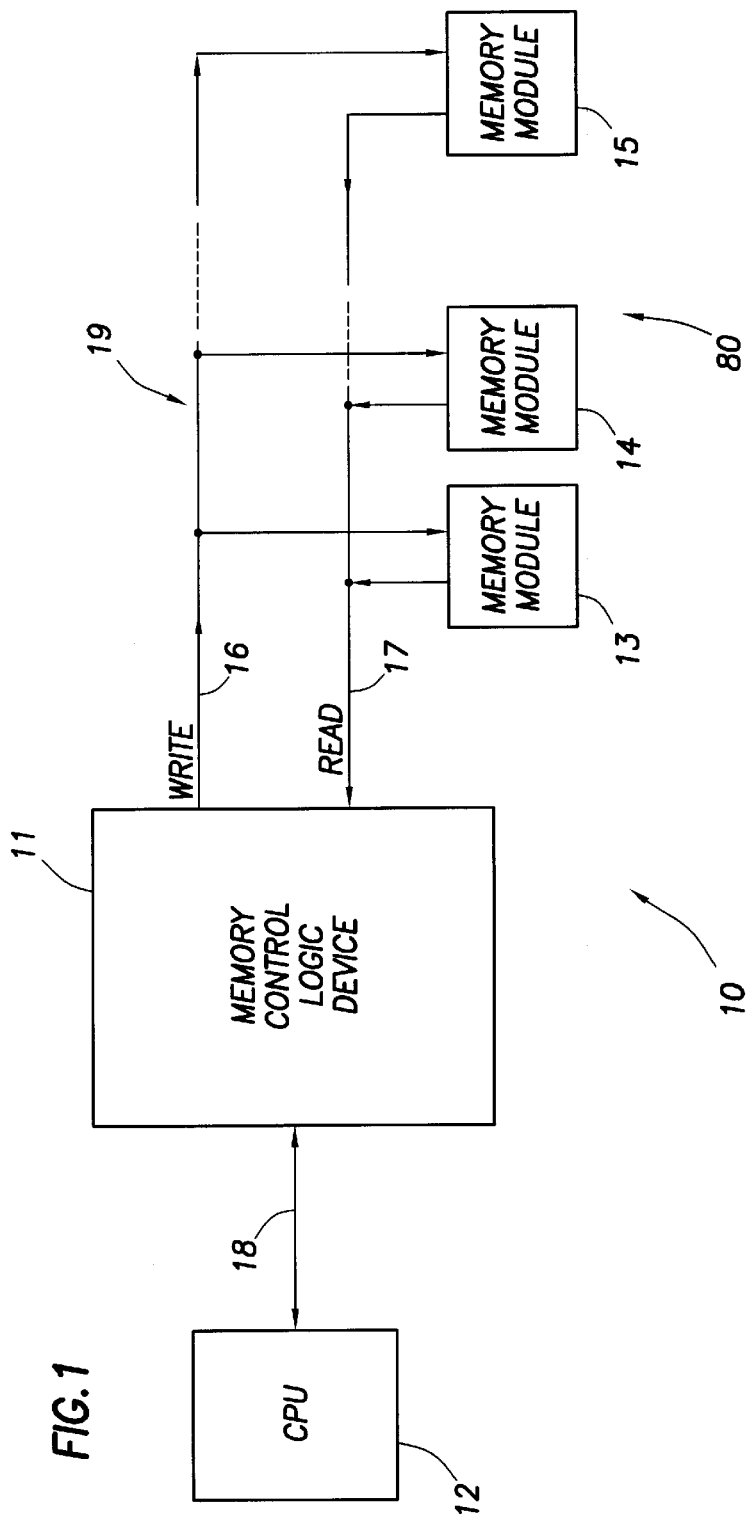
FIG. 1 is a block diagram of a system configuration according to the present invention.

Referring now to the drawings and initially to FIG. 1, there is illustrated, in block diagram form, a high performance computer system. The system 10 comprises a CPU 12, a memory control logic device 11 and a plurality of memory modules 13, 14 and 15, hereinafter collectively referred to as a memory array 80. The CPU 12 is coupled to the memory control logic device 11 by a bus 18. Each of the memory modules 13, 14 and 15 are coupled to the memory control logic device 11 by a write portion 16 and a read portion 17 of a bus arrangement hereinafter referred to as an array bus 19.

The CPU bus 18 is a 32-bit wide, point to point, bidirectional bus arrangement that has an eight nanosecond (hereinafter "ns") bus cycle time. The array bus 19 is a multidrop bus arrangement. The write portion 16 of the array bus 19 is a 32-bit wide bus that has a 16 ns bus cycle time. The read portion 17 of the array bus 19 is a 64-bit wide bus that also has a 16 ns bus cycle time.

The memory control logic device 11 controls memory read timing on the array bus 19 through the use of two array bus 19 read commands, a read early and a read late. A read early command indicates to a selected memory module to send refill data as soon as possible. A read late command requires a selected memory module to delay the transmission of data for a preselected number of array bus 19 cycles. The combination of these two commands is used to achieve maximum bus utilization as is described in copending application Ser. No. 07/445,983 filed on even date herewith which is incorporated herein by reference.

Figure 2:
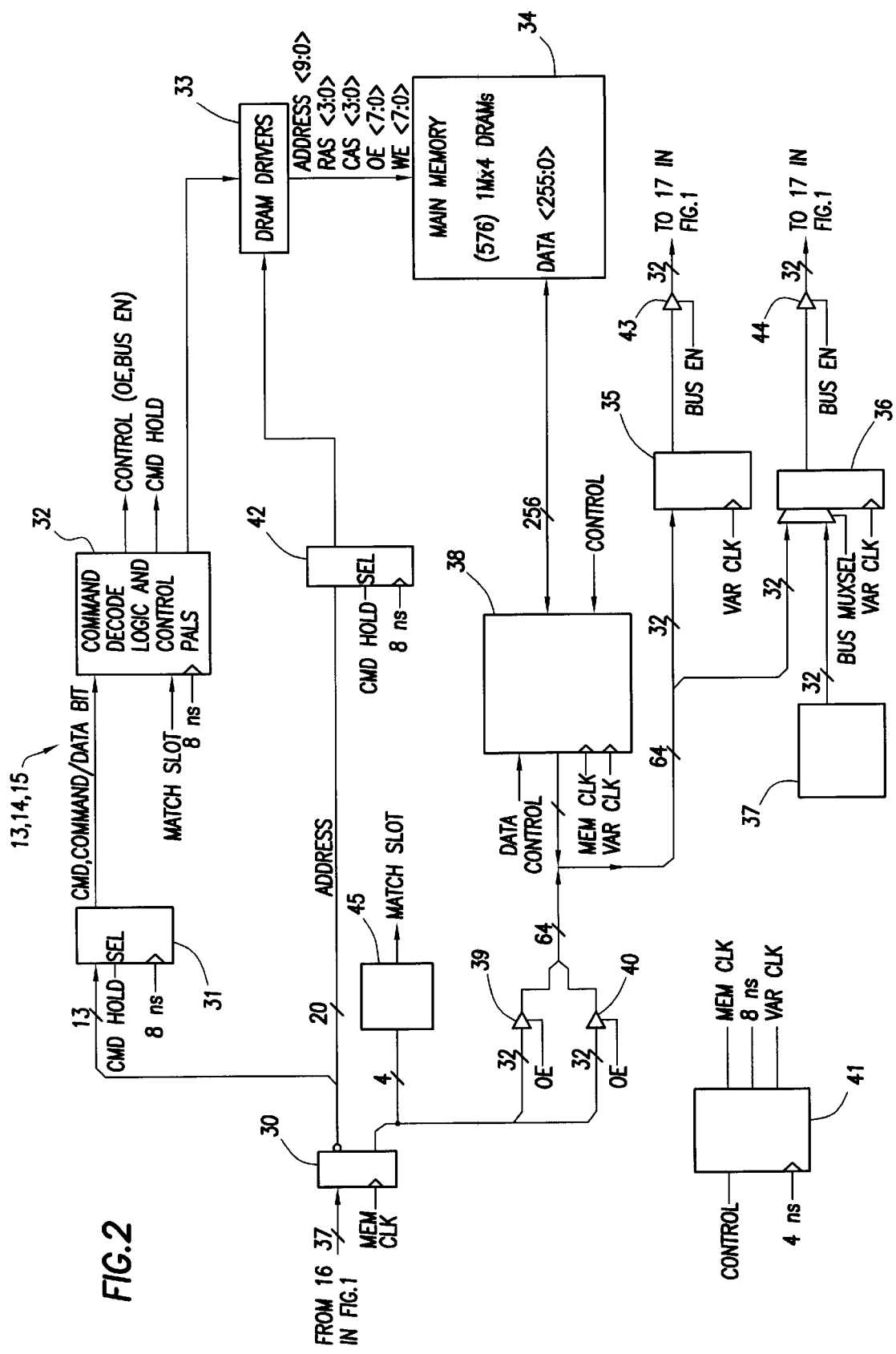
FIG. 2 is a block diagram of a memory module.

Referring now to FIG. 2, there is illustrated, in block diagram form, one of the memory modules 13–15. Each of the memory modules 13–15 comprises a 37-bit wide latch 30, two 32-bit wide latches 35 and 36, a 20-bit wide address latch 42, a 13-bit wide command latch 31, a match slot comparator 45, command decode logic and control PALs (programmable array logic) 32, dynamic RAM (hereinafter "DRAM") drivers 33, main memory 34, a transceiver flip flop 38, a divide by four circuit 41, a configuration register 37 and four drivers 39, 40, 43 and 44. The main memory array is a 1 M×4 DRAM array. Data/address/command information is received from the write portion 16 of the array bus 19 which is coupled to the inputs of the latch 30. Data is output to the read portion 17 of the array bus 19 through the output data latches 35 and 36.

Outputs of the latch 30 are coupled to inputs of the command latch 31, the address latch 42, the match slot comparator 45 and the drivers 39 and 40. Outputs of the command latch 31 are coupled to inputs of the command decode logic and control PALs 32. The command decode logic and control PALs 32 decode the command received from the memory control logic device 11 and generate the proper control signals for the main memory 34, the transceiver flip flop 38, the divide by four circuit 41, the command latch 31, the address latch 42, the divide by four circuit 41, as well as output enable ("OE") and bus enable ("BUS EN") signals which are utilized throughout the module. Outputs of the command decode logic and control PALs 32 are coupled to inputs of the DRAM drivers 33, the transceiver flip flop 38, the divide by four circuit 41, the command latch 31 and the address latch 42. The output of the address latch 42 coupled to inputs of the DRAM drivers 33.

The data received from the write portion 16 of the array bus 19 is output by latch 30 and coupled to the two 32-bit wide drivers 39 and 40, the match slot comparator 45 and a 13-bit wide command latch 31. The drivers 39 and 40 are tristate devices whose output is coupled to a bidirectional data path that couples the transceiver flip flop 38, which is a bidirectional state device, and output data latches 35 and 36. The drivers 39 and 40 are tristated by the OE signal when the transceiver flip flop 38 is transferring data to the output data latches 35 and 36. The transceiver flip-flop 38 is also coupled by a bidirectional data path to the data inputs/outputs of the main memory 34. Data is written to and read from the main memory 34 through the transceiver flip flop 38. Data read from the main memory 34 is passed through the transceiver flip flop 38 and output to the write portion 17 of the array bus 19 through the output data latches 35 and 36 and through drivers 43 and 44. The DRAM drivers 33 are coupled to the address and control inputs of the main memory 34.

The data input of the output data latch 36 is multiplexed between memory data and the output of the configuration register 37. The configuration register 37 contains information that is used by the CPU 12 to determine the memory module type of each particular memory module. This information is accessed by the CPU 12 during system initialization and is used to ascertain information specific to the memory module, e.g., the memory size of the main memory 34, the module identification number, and the read and write latency time periods of the main memory 34 for a particular memory module. This information is stored in a register in the memory control logic device 11, and used as is described later.

The outputs of the output data latch 35 and 36 are coupled to tristate drivers 43 and 44. The outputs of these drivers 43 and 44 are coupled to the read portion 17 of the array bus 19. A four ns system clock is coupled to the divide by four circuit 41. The outputs of the divide by four circuit 41 provide an (1) eight ns clock, a (2) MEMCLK, i.e., a 16 ns clock, and (3) a variable clock. The eight ns clock output is coupled to the command latch 31, the command decode logic and control PALs 32 and the address latch 42. The MEMCLK output is coupled to the latch 30 and the transceiver flip flop 38. The variable clock output is coupled to the transceiver flip flop 38 and the output data latches 35 and 36. The variable clock is controlled by control signals from the command decode logic and control PALs 32. If a read early command is decoded, the variable clock is a 16 ns clock. If a read late command is decoded, the variable clock is a 16 ns clock that is shifted by one-half phase, i.e., eight ns.

Referring now to FIG. 3, there is illustrated in block diagram form, the memory control logic device 11. The memory control logic device 11 comprises a control logic device 60, a memory read data path 61, a memory write data path 62, a memory controller 63 and an array bus write interface 75. The control logic device 60 provides the interface to the CPU bus 18 for the memory control logic device 11. Commands and data are received from and sent to the CPU 12 via the control logic device 60. The memory read data path 61 is the interface between the memory control logic device 11 and the read portion 17 of the array bus 19. It is through this path 61 that read, i.e., refill data is received from a selected memory module 13, 14 and 15 of the memory array 80. The memory write data path 62 provides a path for data received from the CPU 12 to be buffered and then transmitted to the memory array 80. The array bus write interface 75 is the interface to the write portion 16 of the array bus 19. It is through this path 75 that commands and data are sent to the memory array 80 from the memory control logic device 11. The memory controller 63 provides intelligence to the memory control logic device 11 by decoding commands received from the CPU 12, sending commands to a selected memory module in the memory array 80 and monitoring the activities of the array bus 19.

The memory read data path 61 comprises a 64-bit wide latch 64 and an error detection and correction logic device 65. Inputs of the latch 64 are coupled to the read portion 17 of the array bus 19. Outputs of the latch 64 are coupled to inputs of the error detection and correction logic device 65. Outputs of the error detection and correction logic device 65 are coupled to a multiplexer 81 in the memory controller 63. The latch 64 captures the data as it is received from the read portion 17 of the array bus 19. The data is passed through the error detection and correction logic device 65 where an integrity check is performed. The data is then transmitted to the memory controller 63 for transmission to the CPU 12.

The memory write data path 62 comprises two 32-bit wide latches 66 and 57, an 8×64 bit wide write buffer 67, buffer control logic 68 and a multiplexer 58. Inputs to the latches 66 and 57 are coupled to data outputs of the control logic device 60. Outputs of the latches 66 and 57 are coupled to inputs of the write buffer 67. Outputs of the write buffer 67 are coupled to the array bus write interface 75 through the multiplexer 58. The multiplexer 58 is 16 to 1 multiplexer that is controlled by the buffer control logic 68. While data is stored in eight 64 bit entries in the write buffer 67, it is transmitted in 16 long words, i.e., 32 bits. Outputs of the buffer control logic 68 are coupled to busy logic 73 and bus output control 76 in the memory controller 63, write buffer 67 and the multiplexer 58. Outputs of a command decoder 69 and a latch 78 in the memory controller 63 are coupled to inputs of the buffer control logic 68. The buffer control logic 68 is controlled by the memory controller 63. The buffer control logic 68 controls the loading and unloading of the write buffer 67. Data passed to the memory control logic device 11 from the CPU 12 is captured by the latches 66 and 57 and then stored in the write buffer 67 under the control of the buffer control logic 68. The buffer control logic 68 sequentially selects one of the 16 inputs of the multiplexer 58 to pass one 32-bit entry per array bus 19 cycle time to the array bus write interface 75 during a memory write operation.

The memory controller 63 comprises a command decoder 69, three state machines 70, 71 and 72, busy logic 73, a memory queue 74, a multiplexer 81 and three latches 78, 79 and 82. Inputs of the command decoder 69 are coupled to outputs of the control logic device 60. The command decoder 69 receives commands passed from the CPU 12 and determines the type of command received. If a write command is decoded, the command decoder 69 generates a BUFFER WR signal to the buffer control logic 68 to enable the write buffer 67 to capture write data. Outputs of the command decoder 69 are coupled to inputs of the state machines 70, 71 and 72, the buffer control logic 68 and the memory queue 74.

The CPU command is passed from the command decoder 69 to whichever one of the state machines 70, 71 and 72 is available. Outputs of the state machines 70, 71 and 72 and the buffer control logic 68 are coupled to inputs of the busy logic 73. The busy logic 73 interprets the outputs of the state machines 70, 71 and 72 and the buffer control logic 68 to determine the current state of the memory controller 63, the array bus 19 and the memory modules 13, 14 and 15. This state is then fed back to the command decoder 69, the control logic device 60, and the state machines 70, 71 and 72. This information is utilized by the control logic device 60 to prevent the passing of commands to the command decoder 69 when all the state machines 70, 71 and 72 are busy. The information also indicates when commands can be sent and which of the memory modules 13, 14 and 15 are available. An output of the busy logic 73 is also coupled to the latches 64 and 82 to enable them to accept data destined for the CPU bus 18 and to bus output control logic 76 to control the selection of a read or write command.

Outputs of the latch 78 are coupled to the memory queue 74, the buffer control logic 68 and the state machines 70, 71 and 72. Inputs of the latch 78 are coupled to the control logic device 60. It is through this latch 78 that the control logic device 60 passes information to the memory queue 74 and state machines 70, 71 and 72 relevant to commands passed to the memory controller 63. This information comprises the memory module identification number of the selected memory module and the read or write latency time for the selected memory module. The CPU 12 stores this information in a register in the control logic device 60 at system initialization after reading the configuration register 37 of each one of the memory modules 13–15.

Outputs of the control logic device 60 are coupled to inputs of the latch 79. Outputs of the latch 79 are coupled to inputs of the memory queue 74 and multiplexer 77. The latch 79 receives address information from the control logic device 60 and passes the same to the memory queue 74 and multiplexer 77.

Outputs of the memory queue 74 and the error detection and correction logic device 65 are coupled to inputs of the multiplexer 81. Outputs of the multiplexer 81 are coupled to inputs of the latch 82. Outputs of latch 82 are coupled to the control logic device 60. It is through this path that refill data received from one of the memory modules 13, 14 and 15 is passed from the read portion 17 of the array bus 19 to the control logic device 60 for transmission on the CPU bus 18.

Each of the state machines 70, 71 and 72 has a programmable counter associated with it. This counter is programmed by the state machines 70, 71 and 72 through the busy logic 73 to generate a timing signal that is used by the state machines 70, 71 and 72 to track certain time periods. For example, the counter tracks the read latency of a selected memory module and the number of cycles required to transfer refill data on the CPU bus 18.

The memory queue 74 is coupled to receive inputs from the control logic device 60 through the latches 78 and 79, to provide outputs to each of the state machines 70, 71 and 72, to bus output control 76 of the array bus write interface 75 and to the multiplexer 81. One entry per state machine is maintained in the memory queue 74. The information comprising the entries are received from the control logic device 60 through the latches 78 and 79 and stored by the state machines each time a command is passed to the memory controller 63. The entry comprises the 32-bit memory address being accessed, an identification field which represents the memory module of the memory array 80 being accessed, a write access time field and a read access time field. The write access and read access time fields represent the memory latency for reads and writes, respectively, for the main memory 34 of the selected memory module being accessed. This information is used by the memory controller 63 to control the array bus 19 timing of both memory reads an writes.

The memory queue 74 also has a programmable counter. This counter is programmed by the memory queue 74 pursuant to the read access time passed to the memory queue 74 by the control logic device 60 through the latch 78. The counter is enabled by the state machines 70, 71 and 72 through the busy logic 73 when a read command is processed. This counter generates a timing signal that is used by the state machines 70, 71 and 72 to indicate that the value of the count that was loaded in the memory queue counter to account for the read latency of a selected memory module has expired.

The memory queue 74 generates a signal on line 74a, SEND READ EARLY, that is coupled to the memory queue 74 counter, the state machines 70, 71 and 72, and to the bus output control logic 76 of the array bus write interface 75. This signal controls the selection of either a read early or a read late command. For further information regarding the control and selection of read commands, reference should be made to copending application Ser. No. 07/445,983 filed on even date herewith.

The array bus write interface 75 provides the path by which data, address and commands are sent to the memory array 80. The multiplexer 58 of the memory write data path 62 and the latch 78 are coupled to a multiplexer 77. Also coupled to the multiplexer 77 are three hardwired inputs, READ EARLY, READ LATE and WR, a write signal. These inputs are selected to cause a command to be output on the write portion 16 of the array bus 19. An output of the multiplexer 77 is coupled to a latch 59. The memory module identification number is transmitted from control logic device 60 through the latch 78 to an input of the multiplexer 77. The output of the latch 59 is coupled to the write portion 16 of the array bus 19.

The latch 59 and the multiplexer 77 are controlled by bus output control logic 76. The state machines 70, 71 and 72, through the busy logic 73, the memory queue 74 and the buffer control logic 68 are coupled to inputs of the bus output control logic 76. The bus output control logic 76 selects the proper multiplexer input to allow the proper hardwired command, address or data to be passed to the write portion 16 of the array bus as a function of the information received from the state machines 70, 71 and 72 and the SEND READ EARLY signal on line 74a from the memory queue 74.

A CPU CLK signal, a free running eight ns clock, is coupled to the write buffer 67 and latches 66, 57, 82, 78 and 79. The CPU CLK is a free running eight ns clock. The MEM CLK signal, a 16 ns clock derived from an eight ns clock, is coupled to the latches 64 and 59.

Figure 4:
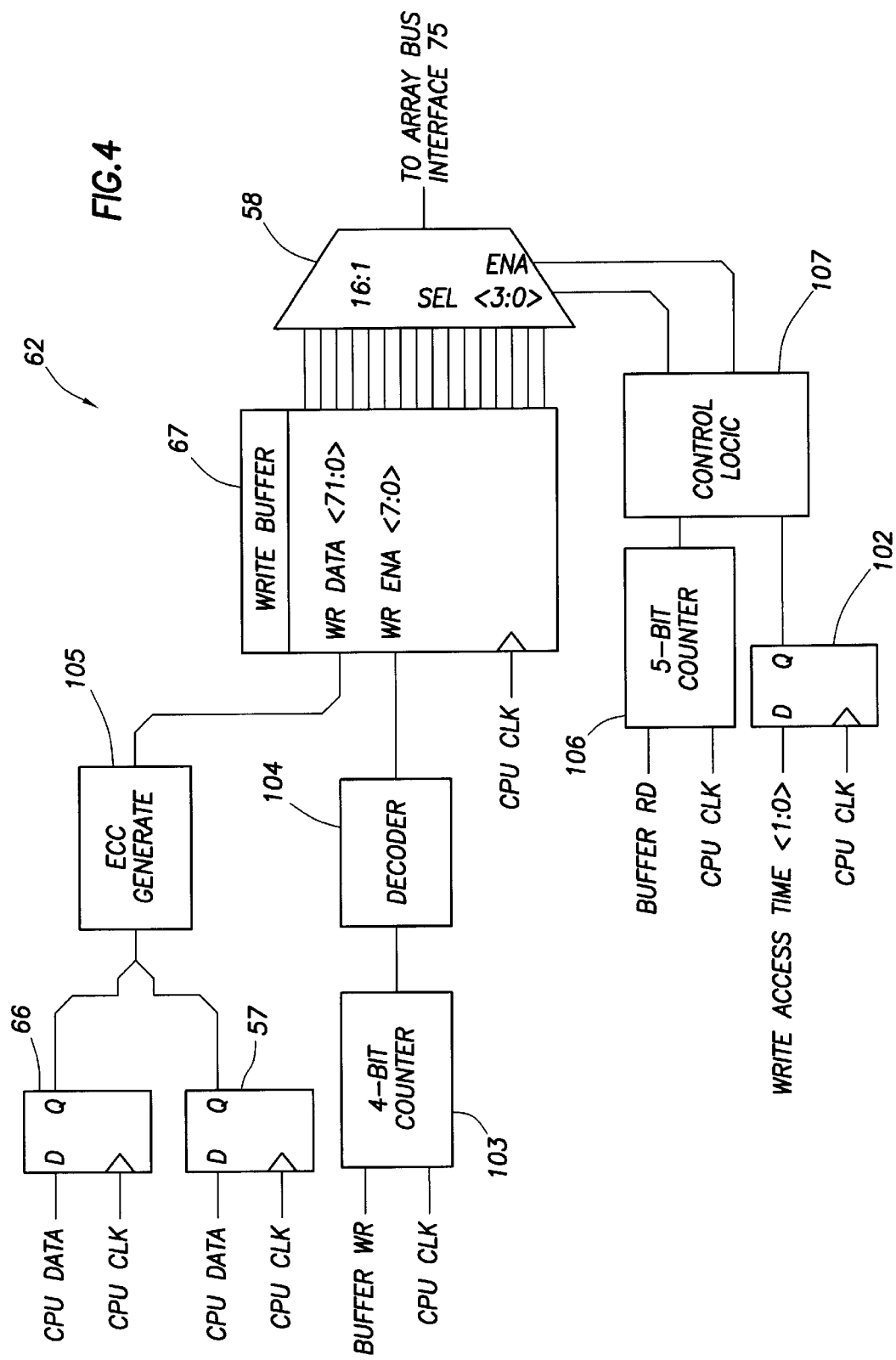
FIG. 4 is a block diagram of the memory write data path.

Referring now to FIG. 4, there is illustrated, in block diagram form, the write data path 62 of FIG. 3. The path 62 comprises three latches 66, 57 and 102, a four-bit counter 103, a decoder 104, an ECC (error correction code) generator 105, a five-bit counter 106, control logic 107, the write buffer 67 and the multiplexer 58. As described above, the data outputs of the control logic device 60 are coupled to the latches 66 and 57. The outputs of the latches are coupled to inputs of the ECC generator 105. Outputs of the ECC generator 105 are coupled to inputs of the write buffer 67. The BUFFER WR signal generated by the command decoder 69 when a write command is decoded, is coupled to an enable input of the four-bit counter 103. The four outputs of the four-bit counter are coupled to inputs of the decoder 104. Outputs of the decoder are coupled to write enable inputs of the write buffer 67. The BUFFER WR signal clears the counter 103 and then enables the counter 103 to count pursuant to the CPU CLK signal that is coupled to its clock input. The counter 103 and the decoder 104 generate eight addresses for the write data received by latches 66 and 57 to be stored in the write buffer 67 under the control of the CPU CLK signal.

A BUFFER RD signal generated by the busy logic 73 pursuant to one of the state machines 70, 71 and 72 that is processing a write command is coupled to an enable input of the counter 106. The CPU CLK signal is coupled to a clock input of the counter 106. The write access time passed to one of the state machines 70, 71 and 72 that is processing a write, is passed through the busy logic 73 to inputs of the latch 102. The CPU CLK signal is also coupled to a clock input of the latch 102. Outputs of the counter 106 and the latch 102 are coupled to the control logic 107. Outputs of the control logic 107 are coupled to select inputs and enable inputs of the multiplexer 58.

The control logic 107 selects the appropriate output of the write buffer 67 to pass a 32-bit long word through the multiplexer 58 pursuant to the output of the counter 106 and the write access time as set forth in FIG. 5. Referring now to FIG. 5, this figure indicates how the write buffer 67 outputs are selected by the ENA signal and the output of counter 106 for write access times of zero to three. Also shown in FIG. 5 are blank cycles that are interspaced between the time when the write buffer 67 outputs are selected as shown at points 110–111, 112–113, 114–115 and 116–117. The use of these blank cycles is described later.

There are fifteen valid input signals to the state machines 70, 71 and 72. A valid command ("VLD CMD") signal is an output from the command decoder 69 to each of the state machines 70, 71 and 72. The VLD CMD signal starts an execution cycle for a state machine. Read and write ("RD" and "WR") signals are also output by the command decoder 69 to the state machines 70, 71 and 72. These signals are asserted with the VLD CMD signal to direct one of the state machines 70, 71 and 72 to perform a read or write operation. A command pending ("CMD PENDING") signal is output by the busy logic 73 to inform the state machines 70, 71 and 72 that the array bus 19 is busy, therefore, the selected state machine must wait. This signal is generated by logically ORing certain outputs of the state machines 70, 71 and 72 that are described below and the signal generated by the buffer control logic 68 and sent to the busy logic 73 that indicates a write is in progress. An overflow ("OVF") signal is an output of the counter associated with each one of the state machines 70, 71 and 72 that provides a means for establishing specific time delays as will be explained below. An abort ("ABORT") signal is output by the control logic device 60 to indicate an error condition has occurred, and as such, stops the state machines 70, 71 and 72 from sending data back to the CPU 12. A state machine initialization ("SM INIT") signal is an output of the CPU 12 that provides a power on reset signal to initialize each of the state machines 70, 71 and 72. A memory busy ("MEM BSY") signal is an output of the busy logic 73 that is coupled to each of the state machines 70, 71 and 72 to indicate that a selected memory module is busy. STATE <6>–<0>signals are output by the individual state machines to direct a state machine to enter a new state.

Each one of the state machines 70, 71 and 72 generates nineteen output signals that are utilized either by the state machines 70, 71 and 72 or by other logic within the memory control logic device 11. A set read busy ("SET RD BSY") signal, output to the busy logic 73 to indicate that a read is in progress, is the signal ORed with the signal output by buffer control logic 68 to generate the CMD PENDING signal. This signal is available to the other state machines along with the identification number of the selected memory module to indicate that a particular memory module is busy. A set write busy ("SET WR BSY") signal is also output to the busy logic 73 to perform the same functions for a write cycle as the SET RD BUSY signal does for a read cycle. A clear valid ("CLR VLD") signal is output to the busy logic 73 and issued to clear the memory queue 74 entry for the particular state machine when the state machine has completed its task. A refill ("REFILL") signal is coupled to the counters associated with the state machines 70, 71 and 72 to load the state machine counters with the proper value to count 17 CPU bus 18 cycles to establish the refill time delay and also outputs the refill command on the CPU bus 18.

A next read valid ("NEXT RD VLD") signal is coupled to the programmable counter in the memory queue 74 to inform the memory queue 74 that another read is ready to be issued. An array bus read ("ARRAY BUS RD") and an array bus write ("ARRAY BUS WR") signal is sent by the current state machine through the busy logic 73 to the bus output control logic 76 to indicate the command to issue and also start the programmable counter in the memory queue 74 and the state machine counter. A disabled abort ("DIS ABORT") signal is fed back to the state machines 70, 71 and 72 to instruct the state machines 70, 71 and 72 to ignore the ABORT signal during certain states because it is not valid.

A CPU bus request ("CPU BUS REQ") signal is coupled to the control logic device 60 to inform it that refill data will be output by the latch 82. This signal is output three CPU bus 18 cycles before refill data is put on the CPU bus 18. A queue busy ("QUEUE BSY") signal is among the control signals output by the busy logic 73 to the control logic device 60 that prevents the control logic device 60 from sending commands to the state machines 70, 71 and 72 when they are busy. A set read pending ("SET RD PENDING") signal is an output of the busy logic 73 that is fed back to the control logic device 60 to inform the device that refill data is coming, therefore, the CPU bus 18 must be available. This signal is a function of the state machine counter. It is issued prior to the time when a refill command is output. A memory recovery ("MEM RECOVERY") signal is coupled to the state machine counters. This signal sets the state machine counters to count for a preselected number of array bus 19 cycles to allow the selected memory module to recover from the current data transfer operation. GO TO <6> to GO TO <0> signals are output by a state machine which direct the current execution state of the state machine.

Set forth below, in pseudo code format, is the operation of the state machines 70, 71 and 72. Each state machine independently sequences through these states by receiving and generating its own set of input and output signals.

```
If (STATE<0>) then begin;
  DIS ABORT;
  If (VLD CMD) then begin;
    If (RD) then begin,
      SET RD BSY;
      SET RD PENDING;
      If (NOT CMD PENDING) then begin;
        ARRAY BUS RD;
        GO TO <1>;
      end;
      else begin;
        QUEUE BSY;
        GO TO <3>;
      end;
    end;
    If (WR) then begin;
      SET WR BSY;
      If (NOT MEM BSY) then begin;
        ARRAY BUS WR;
        GO TO <4>;
      end;
      else begin;
        QUEUE BSY;
        GO TO <5>;
      end;
    end;
  end;
  else GO TO <0>
end;
If (STATE<1>) then begin;
  SET RD BSY;
  SET RD PENDING;
```

-continued

```
  If (OVF) then begin;
    REFILL;
    DIS ABORT;
    If ( NOT ABORT) then CPU BUS REQ;
    GO TO <2>;
  end;
  else GO TO <1>;
end;
If (STATE<2>) then begin;
  DIS ABORT;
  SET RD BSY;
  If ( NOT ABORT) then begin;
    CPU BUS REQ;
    SET RD PENDING;
  end;
  If (OVF) then begin;
    MEM RECOVERY;
    GO TO <6>;
  end;
  else GO TO <2>;
end;
If (STATE<3>) then begin;
  If (ABORT) then begin;
    DIS ABORT;
    CLR VLD;
    GO TO <0>;
  end;
  else begin;
    SET RD PENDING;
    SET RD BSY;
    If ( NOT CMD PENDING) then begin;
      DIS ABORT
      ARRAY BUS RD;
      GO TO <1>;
    end;
    else begin;
      NEXT RD VLD;
      QUEUE BSY;
      GO TO <3>;
    end;
  end;
end;
If (STATE<4>) then begin;
  DIS ABORT;
  If (OVF) then GO TO <0>;
  else begin;
    SET WR BSY;
    GO TO <4>;
  end;
end;
If (STATE<5>) then begin;
  SET WR BSY;
  If (NOT MEM BSY) then begin;
    ARRAY BUS WR;
    GO TO <4>;
  end;
  else begin;
    QUEUE BSY;
    GO TO <5>;
  end;
end;
If (STATE <6>) then begin;
  If (OVF) then begin;
    CLR VLD;
    GO TO <0>;
  end;
  else begin;
    SET RD BSY;
    GO TO <6>;
  end;
end;
If (SM INIT) then begin;
  CLR VLD;
  GO TO <0>;
end;
```

As set forth above, the state machines 70, 71 and 72 operate in six individual states. State 0 is the idle state where a state machine loops continuously until a command is received. State 1 is the state in which a state machine enters when a read command is processed. State 2 is the state where a state machine monitors the receiving of refill data from the array bus 19 and then transmits the refill data to the CPU bus 18. State 3 is entered by a state machine when a read command has been received but there is a command pending, i.e., the command was received while another read command or a write command is in progress, so the state machine must wait. State 4 is the state entered by a state machine when a write command is processed. State 5 is the state entered by a state machine when a write command is to be processed, but the selected memory module is busy. The state machine must wait until the memory module is available. State 6 is the state that the state machine enters to allow the selected memory module to finish the previous command before allowing another command to be issued. It is essentially to insure the memory module has finished the command before a new command is issued.

Each one of the state machines 70, 71 and 72 starts in an idle state, i.e., state 0. The first step that a state machine, e.g., state machine 70 performs in state 0 is to disable the ABORT signal because abort is not valid in state 0. In state 0, the state machine 70 is looking for a VLD CMD signal to start processing. If no VLD CMD signal is received, the state machine 70 continues to loop in state 0 until a valid command is received.

Upon receiving a VLD CMD signal, the state machine 70 tests for the particular type of command received. If a read is received, the SET RD BSY and the SET RD PENDING signals are set. The state machine 70 then examines to see if the CMD PENDING signal is set, i.e., this read command has been received while another read or write command is in progress. If the CMD PENDING signal is not asserted, the state machine 70 processes the read by generating an ARRAY BUS RD signal and then entering state 1.

If the CMD PENDING signal is set, the state machine 70 asserts a QUEUE BSY signal to prevent the control logic device 60 from sending more commands. The state machine 70 then enters state 3 to wait for the CMD PENDING signal to be deasserted.

If a WR command is received with the VLD CMD signal, the SET WR BSY signal is set. The state machine 70 determines if the selected memory module is busy by testing the MEM BSY signal. If the MEM BSY signal is not asserted, the memory module is not busy. The state machine 70 then generates an ARRAY BUS WR signal which causes the bus output control logic 76 to select a write command to be issued on the write portion 16 of the array bus 19. The state machine counter is also programmed to count for the write latency time of the selected memory module. The write buffer 67 is also unloaded at this time and data is transmitted on the write portion 16 of the array bus 19, and then the state machine 70 enters state 4.

If a selected memory module was busy, the state machine 70 would assert the QUEUE BSY signal to perform the same function that the QUEUE BSY signal performed for a read command, however, the state machine 70 would enter state 5 to wait for the QUEUE BUSY signal to be deasserted.

State 1 sets up the read command and puts the state machine 70 into the proper flow to accomplish a read. The state machine counter is loaded with a value representative of the memory read latency time of the selected memory module when the read signal is generated. The state machine 70 asserts the SET RD BSY and the SET RD PENDING signals and then loops in state 1 until the OVF signal is received from the state machine counter indicating that the memory read time has elapsed. When this read time OVF signal is generated, the busy logic 73 turns on latch 64 to capture the data from the read portion 17 of the array bus 19 and informs the control logic device 60 that it will need the CPU bus 18 in two cycles to transmit the refill data by transmitting a CPU BUS REQ signal. If an ABORT signal is detected, the data is not sent. A REFILL signal starts the state machine counter counting for 17 CPU bus 18 cycles, the number of cycles required to transfer 64 bytes of data to the CPU 12. The CPU BUS REQ signal is the signal that puts the refill command on the bus. This CPU BUS REQ signal must be asserted during the entire refill sequence.

State 2 is the state entered into by the state machine 70 from state 1 where the refill data is being transmitted to the CPU bus 18. The state machine 70 stays here until the state machine counter overflows, i.e., the entire 17 CPU bus 18 cycles time period loaded in state 1 have expired indicating that the refill is complete. At this point, the MEM RECOVERY signal is asserted and the state machine 70 enters state 6.

As discussed above, the state machine 70 enters state 3 when a read command has been received but the CMD PENDING signal is asserted, i.e., the command was received while another read is in progress. If no ABORT signal has been received, the state machine 70 asserts the SET RD PENDING signal and the SET RD BSY signal and continues to loop waiting for the CMD PENDING signal to be deasserted. If the CMD PENDING signal has not been deasserted, the state machine 70 generates the NXT RD VLD signal, the QUEUE BSY signal and continues to loop in state 3. When the CMD PENDING signal is deasserted, the ABORT signal is disabled because it is not valid and the ARRAY BUS RD signal is set. The state machine 70 then enters state 1 to initiate the read procedure. The ARRAY BUS RD signal is passed to the bus output control logic 76 and is used in combination with the SEND READ EARLY signal output by the memory queue 74 to select a read early or read late to be transmitted on the write portion 16 of the array bus 19.

State 4 is similar to state 2 for write operations. The state machine 70 has entered state 4 from state 0 pursuant to issuing an ARRAY BUS WR signal. The state machine 70 waits here for the OVF signal to be asserted indicating that the write count loaded in the state machine counter has overflowed, i.e., it is waiting for the selected memory module to complete the write command. If the OVF signal is not asserted, the state machine 70 asserts the SET WR BSY signal and loops in state 4 until the write is completed.

State 5 is the state entered from state 0 when a write command has been received but the selected memory module is busy. While the MEM BSY signal is asserted, data coming from the CPU 12 is loaded into the write buffer 67. This data, however, cannot be output to the write portion 16 of the array bus 19 because the selected memory module is busy. The state machine 70 first asserts the SET WR BSY signal and then loops in state 5 until the MEM BSY signal is deasserted. During looping, the QUEUE BSY signal is asserted. When the MEM BSY signal is deasserted, the state machine 70 generates the ARRAY BUS WR signal and enters state 4 to perform the write operation.

State 6 is the state entered by the state machine 70 when a command is finished. The purpose of state 6 is to allow the selected memory module to complete the command performed before a new command is sent. Therefore, if the OVF signal is set, the state machine 70 asserts the CLR VLD signal and then enters state 0 to return to the idle state. If upon entering state 6, the OVF signal is not asserted, the state machine 70 asserts the SET RD BSY signal and loops in state 6 until the OVF signal is detected.

The memory array 80 cannot write data received on the write portion 16 of the array bus 19 as fast as it is delivered by the memory control logic device 11. This is because the DRAMs which comprise the main memory 34 of the memory modules 13–15 are slow and cannot be cycled as fast as the array bus 19 can transfer data.

To overcome the disparity in speed between the cycle time of the array bus 19 and the memory array 80, the present invention provides minimal buffering on each of the memory modules 13, 14 and 15 in the transceiver flip-flop 38. The transceiver flip-flop 38 is capable of only latching 32 bytes of data at a time. Data is transferred from the CPU 12 to the memory control logic device 11 in blocks of 64 bytes. Thus, the present invention provides for the writing of data in a plurality of data bursts, e.g., two bursts of 32 bytes and pausing for a preselected amount of time in between the bursts long enough to allow the latched data to be written into the main memory 34 before the memory control logic device 11 writes the remaining data bursts to the selected memory module.

A write operation from the CPU 12 is performed in 64 byte data blocks that takes 16 consecutive CPU bus 18 cycles to transfer to the memory control logic device 11. This entire block of data is destined for a single memory module, for example, memory module 13. A write command is received by the control logic device 60 and passed to the command decoder 69. The command is decoded and issued to the next available state machine 70, 71 and 72. The available state machine, e.g., 70, is aware that data is being continuously received for 16 CPU bus 18 cycles and written to the write buffer 67. The write buffer 67 of the memory control logic device 11 stores the 64 byte data block received from the CPU 12, thus minimizing the involvement of CPU 12 in write to memory operations.

After, or while the data block is stored in the write buffer 67, the state machine 70 sequences through the states described above to issue a write command to the bus control logic 76 and the buffer control logic 68. The state machine 70 also loads its counter with a value representative of the sum of the write latency of the selected memory module 13 and the number of array bus 19 cycles required to transmit 64 bytes of data. The buffer control logic 68 then transmits two bursts of data from the write buffer 67 through the multiplexers 58 and 77 to the latch 59 onto the write portion 16 of the array bus 19 when the selected memory module 13 becomes available. The first data burst transfers a write command and address (one array bus 19 cycle) followed by the first eight entries (a portion of the data block that is divided into eight subportions, one every array bus 19 cycle) in the write buffer 67 which are 32 bytes of data, to the memory module 13 (eight array bus 19 cycles) for a total of nine array bus 19 cycles. The selected memory module 13 latches this data into the transceiver flip-flop 38 and then writes the data to its main memory 34.

To avoid the need for more buffering on the memory module 13, the control logic 107 in the buffer control logic 68 stops the transmission of the second data block on the array bus 19 for a preselected amount of time equal to the write latency of the selected memory module, e.g., four bus cycles, to allow the memory module 13 to transfer the received data to its main memory 34. The write latency information of the selected memory module 13 is passed by the control logic device 60 with the command to the state machine 70. This information is subsequently passed to the latch 102 in the buffer control logic 68. During the preselected pause, the buffer control logic 68 deasserts the CMD PENDING signal.

At the end of the preselected number of array bus 19 cycles, the buffer control logic 68 reasserts the CMD PENDING signal and then transmits a further portion of the data block, in this case, the remainder which is the next eight entries from the write buffer 67 as a second burst of 32 bytes of data to the memory module 13 thus completing the write cycle. This data is latched into the transceiver flip-flop 38 and then written to the main memory 34. At this time, the counter of the state machine 70 generates the OVF signal indicating the completion of the write cycle. This causes the state machine 70 to enter the idle state, i.e., state 0.

As discussed above, during the preselected number of bus cycle times pause between the two bursts of write data, the buffer control logic 68 deasserts the CMD PENDING signal. At this point, if either of the remaining state machines 71 and 72 were looping in state 3, i.e., waiting to issue a read command, the state machines 71 and 72 can now issue read commands that were received from the CPU 12 destined for a memory module other than the selected memory module 13. If such a read command is pending, one of the state machines 71 or 72 issues this read command on the array bus 19 during the preselected pause, before the write operation to memory module 13 is completed. The positioning of the interleaved read command is based upon information in the memory queue 74 for other read commands that are already in progress and depends upon when the last read was issued and what type of read command, i.e., read late or read early, was issued. For further information regarding the positioning of read commands, reference should be made to copending application Ser. No. 07/445,983 filed on even date herewith. This interleaving of a read command during a lull in a write transaction helps reduce overall memory read latency and makes better use of the available memory and bus bandwidth.

During a write operation on the memory module side, a memory module must determine if it is the selected memory module by decoding signals transmitted from the control logic device 11. The signals received from the control logic device 11 by latch 30 comprise 37 bits of information. This information comprises 32 data bits, a command/data bit, and four ECC bits. The command/data bit indicates the type of data received by a memory module. If the command/data bit equals zero, the information on the write portion 16 of the array bus 19 comprises a command. If the command/data bit equals one, the information on the write portion 16 of the array bus 19 comprises data.

During a command cycle, the ECC bits comprise the slot number of the selected memory module. The ECC bits are coupled through the latch 30 to the match slot comparator 45. Comparator 45 generates a MATCH SLOT signal when the slot number passed with the command equals the slot number of the memory module. The MATCH SLOT signal is coupled to the command decode logic and control PALs 32. The command decode logic and control PALs 32 generate a CMD HOLD signal pursuant to receiving the MATCH SLOT signal, provided the command/data bit is not asserted. The CMD HOLD signal is coupled to the command latch 31 and address latch 42. This signal prevents the latches 31 and 42 from changing the data at its outputs during the subsequent array bus 19 cycles thereby preserving the command in latch 31 and the address in latch 42.

Upon generating the CMD HOLD signal, the command decode logic and control PALs 32, whose state changes every subsequent array bus 19 cycle, enters state one. The PALs in the command decode logic and control PALs 32 examine the state and generate the appropriate signals.

For a write command cycle, the data is latched into latch 30. The output of latch 30 is then loaded into latches 31 and 42 eight ns later pursuant to the eight ns clock generated by the divide by four logic 41. The output of latch 30 is also captured by the comparator 45 which generates the MATCH SLOT signal. At state one, i.e., the next array bus 19 cycle, the CMD HOLD signal is generated by the command decode logic and control PALs 32 which freezes the command in latch 31 and the address in latch 42. The command is decoded and a write command is detected.

Upon entering state one, the first long word of data is latched into latch 30. This data is passed through the drivers 39 and 40 to the inputs of the transceiver flip flop 38. At the same time the second long word of data is latched into latch 30, the first long word of data is latched into the transceiver flip flop 38. The transceiver flip flop 38 latches the long words of data under the control of clock enable write control signals generated by the command decode logic and control PALs 32. This process of latching the next long word and storing the previous long word continues until the eighth long word of data is latched into the transceiver flip flop 38.

At this point, the first block of write data has been received by the memory module and is stored in the transceiver flip flop 38. There are blank or null cycles occurring now on the write portion 16 of the array bus 19. The number of blank cycles is equivalent to the write latency of the DRAMs comprising the main memory 34. The selected memory module is ignoring these null cycles. The command decode logic and control PALs 32 then generates a write enable signal which is presented to the main memory 34 through the DRAM drivers 33. This signal causes the long words of data stored in the transceiver flip-flops 38 to be stored in the main memory 34.

After the data has been stored in the main memory 34 and the write enable signal has been deasserted, the ninth long word of data is latched into latch 30. The ninth long word of data is latched into the transceiver flip-flops 38 as the tenth long word of data is latched into latch 30. This process continues until the sixteenth long word of data is latched into the transceiver flip-flop 38. The second data block is then stored in the main memory 34 by strobing the write enable signal. The command decode logic and control PALs 32 then deasserts the control signals driving the main memory 34 through the DRAM drivers 33, deassert the CMD HOLD signal, return to an idle state and is ready to receive another command.

Figure 6:
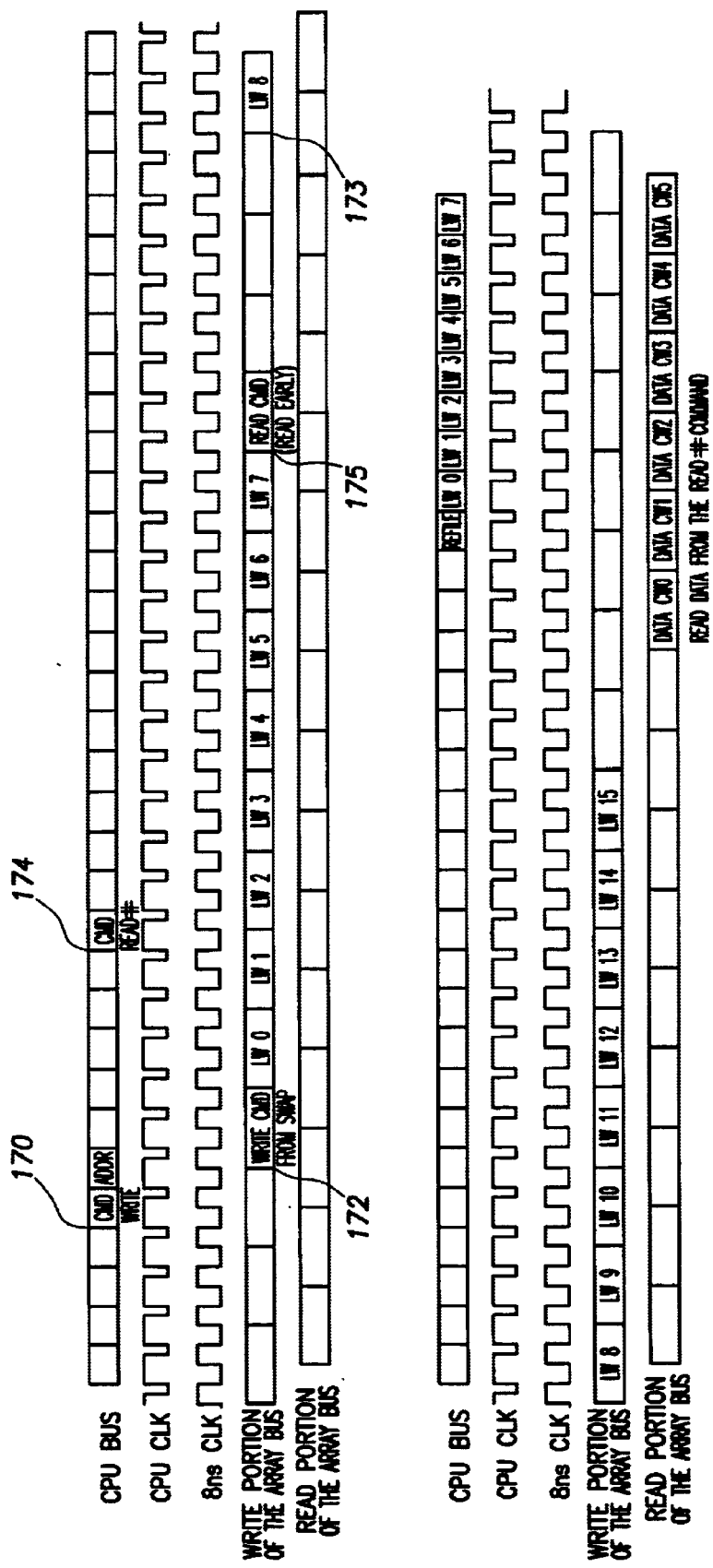
FIG. 6 is a timing diagram that illustrates bus timing of the present invention.

Referring now to FIG. 6, there is illustrated in a timing diagram, the interleaving of the read and write operations of the present invention. FIG. 6 depicts signals related to the CPU bus 18, the CPU bus clock, the 8 ns clock, the write portion 16 and the read portion 17 of the array bus 19.

The command issued by the CPU 12 on the CPU bus 18 at point 170 is a write command. The command is received by the control logic device 60, passed to the command decoder 69 and then to the next available state machine, e.g. 71, which sequences through the proper states to issue a write command followed by eight consecutive array bus 19 cycles of data to transfer eight longwords of data to the selected memory module, e.g. 13, at point 172. As explained above, the CPU 12 writes a 64-byte block of data that is stored in the write buffer 67 and written out in 32-byte blocks. Before the second 32-byte block is written as shown at point 173, there is a pause in the transmission of data from the write buffer 67 to the selected memory module for a preselected amount of time, e.g., four array bus 19 cycles as shown between points 175 and 173. This pause is equal to the write access time of the main memory 34 of the selected memory module 13. During these dead cycles, the selected memory module 13 has latched the data received on the write portion 16 of the array bus 19 into its transceiver flip-flop 38 and is transferring the data to the main memory 34.

While the first burst of data is being written to the array bus 19, the CPU 12 issues a read command at point 174 to a memory module other than the one being currently written, e.g., memory module 14. This command is received by the control logic device 60, passed to the command decoder 69 and then passed to the next available state machine, e.g. 72. In processing this command, the state machine 72 determines that the CMD PENDING signal is asserted pursuant to the write command issued at point 172. It determines that it cannot issue a read command because the write portion 16 of the array bus 19 is busy. The state machine 72 enters state 3 and waits for the CMD PENDING signal to be deasserted.

Pursuant to a feature of the present invention, the available state machine 72 issues the pending read command as soon as possible after the write portion 16 of the array bus 19 becomes available. The window of opportunity for state machine 72 to issue its read command is during the preselected amount of time that state machine 71 pauses to allow the write data to be written to the main memory 34 of the selected memory module 13. It is during this time that the buffer control logic 68 deasserts the CMD PENDING signal to allow the processing of pending read commands. This command is issued at point 175. Thus, the present invention provides for the interleaving of read and write commands. For further information regarding the issuance of read commands, reference should be made to copending application Ser. No. 07/445,983 filed on evendate herewith.

The above described embodiment of the invention is meant to be representative only, as certain changes may be made therein without departing from the clear teachings of the invention. Accordingly, reference should be made to the following claims which alone define the invention.

What is claimed is:

1. A method for interleaving a read operation and a write operation on a bus having a bus cycle time in a computer system including the bus and a first device, the method comprising the steps of:
    a) operating the first device to transmit a portion of a write data block on the bus during a first period, the first period including at least one bus cycle time;
    b) operating the first device to pause for a preselected number of bus cycle times;
    c) operating the first device to transmit a read command on the bus during the preselected number of bus cycle times pause; and
    d) operating the first device to transmit a further portion of the write data block on the bus during a second period, the second period including at least one bus cycle time.

2. A method for interleaving a read operation and a write operation on a bus having a bus cycle time in a computer system which comprises the bus, a memory control logic device and a plurality of memory modules, the memory control logic device coupled to the plurality of memory modules by the bus, comprising the steps of:
    a) operating the memory control logic device to transmit a portion of a write data block on the bus from the memory control logic device during a first period, the first period including at least one bus cycle time, to a first one of the plurality of memory modules;

b) operating the memory control logic device to pause for a preselected number of bus cycle times;

c) operating the memory control logic device to transmit a read command on the bus from the memory control logic device to a second one of the plurality of memory modules during the preselected number of bus cycle times pause; and d) operating the memory control logic device to transmit a further portion of the write data block on the bus from the memory control logic device during a second period, the second period including at least one bus cycle time, to the first one of the plurality of memory modules.

3. The method according to any one of claims 1 or 2 wherein the further portion of the write data block is a remainder of the write data block.

4. The method according to claim 2 wherein step a) further comprises a step of operating the memory control logic device to transmit the portion of the write data block in a plurality of subportions of write data on the bus, one of the plurality of subportions of write data being transmitted per bus cycle time from the memory control logic device to the first one of the plurality of memory modules.

5. The method according to claim 4 wherein step a) further comprises a step of operating the memory control logic device to count the bus cycle times to control the transmission of the plurality of subportions of write data on the bus from the memory control logic device to the first one of the plurality of memory modules such that one of the plurality of subportions of write data is transmitted per bus cycle time.

6. The method according to claim 5 wherein step b) further comprises a step of operating the memory control logic device to disable the counting of the bus cycle times controlling the transmission of the plurality of subportions of write data on the bus from the memory control logic device to the first one of the plurality of memory modules for the preselected number of bus cycle times.

7. The method according to claim 6 wherein step d) further comprises a step of operating the memory control logic device to transmit the further portion of the write data block in a second plurality of subportions of write data on the bus, one of the second plurality of subportions of write data being transmitted per bus cycle time from the memory control logic device to the first one of the plurality of memory modules.

8. The method according to claim 7 wherein step d) further comprises a step of operating the memory control logic device to restart the counting of the bus cycle times to control the transmission of the plurality of subportions of write data on the bus from the memory control logic device to the first one of the plurality of memory modules.

9. A method for transmitting data to a memory module in a memory system that communicates over a bus having a bus cycle time, where the bus cycle time is less than the memory latency of the memory module, the bus is coupled to the memory module, the method comprising the steps of:

(a) operating the memory module to receive a portion of a write data block on the bus;

(b) operating the memory module to not receive a further portion of the write data block for a preselected number of bus cycle times;

(c) operating the memory module to store the portion of the write data block received by the memory module; and (d) repeating steps (a), (b) and (c) until the write data block has been stored by the memory module.

10. A method for minimizing buffering requirements on a memory module in a memory system that communicates over a bus having a bus cycle time, where the bus cycle time is less than the memory latency of the memory module, the memory module is coupled to the bus, the memory module comprises a buffer and a random access memory, the method comprising the steps of:

(a) operating the memory module to receive a portion of a write data block on the bus to the memory module;

(b) operating the memory module to capture the portion of the write data block in the buffer;

(c) operating the memory module to not receive a further portion of the write data for a preselected number of bus cycle times;

(d) operating the memory module to transfer the portion of the write data block from the buffer to the random access memory; and (e) repeating the steps (a), (b), (c) and (d) until the entire write data block has been stored by the memory module in the random access memory.

11. A method for transmitting data to a memory module in a computer system which comprises the memory module, a memory control logic device having storage means, and a bus having a bus cycle time, the bus is coupled to the memory module, and the memory control logic device, the bus cycle time is less than the memory latency of the memory module, the method comprising the steps of:

(a) operating the memory control logic device to transmit a portion of a write data block from the memory control logic device over the bus to the memory module;

(b) operating the memory control logic device to pause a preselected number of bus cycle times before transmitting a further portion of the write data block;

(c) operating the memory module to store the portion of the write data block received by the memory module; and (d) repeating steps (a), (b) and (c) until the entire write data block has been stored by the memory module.

12. The method according to claim 11 wherein the computer system has a central processing unit and a second bus, the second bus intercoupling the central processing unit and the memory control logic device, the method further comprising a step of operating the central processing unit to transmit a write command and the write data block over the second bus from the central processing unit to the memory control logic device prior to the step of operating the memory control logic device to transmit a portion of a write data block from the memory control logic device.

13. The method according to claim 12 further comprising a step of operating the memory control logic device to decode the write command received from the second bus by the memory control logic device prior to the step of transmitting a portion of a write data block from the memory control logic device.

14. The method according to claim 13 wherein the step of operating the memory control logic device to transmit a portion of a write data block further comprises a step of operating the memory control logic device to transmit the portion of the write data block in a plurality of subportions of write data on the bus, one of the plurality of subportions of write data being transmitted per bus cycle time, from the memory control logic device to the memory module.

15. The method according to claim 14 wherein the step of operating the memory control logic device to transmit a portion of a write data block further comprises a step of operating the memory control logic device to count the bus cycle times used by the memory control logic device to control the transmission of the plurality of portions of write data on the bus from the memory control logic device to the memory module.

16. The method according to claim 15 wherein the step of operating the memory control logic device to pause for a preselected number of bus cycle times further comprises a step of operating the memory control logic device to disable the counting of the bus cycle times used by the memory control logic device to control the transmission of the plurality of subportions of write data on the bus from the memory control logic device to the memory module for the preselected number of bus cycle times.

17. The method according to claim 16 further comprising a step of operating the memory control logic device to restart the counting of the bus cycle times used by the memory control logic device to control the transmission of the plurality of subportions of write data on the bus from the memory control logic device to the memory module prior to repeating the steps (a), (b) and (c).

18. The method according to claim 17 wherein the step of operating the memory control logic device to transmit a portion of a write data block from the memory control logic device further comprises a step of operating the memory control logic device to include a bus write command in a first subportion of the portion of the write data block transmitted from the memory control logic device over the bus to the memory module.

19. The method according to claim 18 wherein the step of operating the memory module to store the portion of the write data block further comprises a step of operating the memory module to decode the bus write command included in the first subportion of the portion of the write data block transmitted from the memory control logic device over the bus to the memory module.

20. The method according to any one of claims 11, 12, 13 or 14 wherein the memory module has a buffer and a random access memory, further comprising a step of operating the memory module to capture each one of the plurality of subportions of the write data block in the buffer after the step of operating the memory control logic device to transmit the portion of a write data block on the bus from the memory control logic device to the memory module.

21. The method according to 20 wherein the step of operating the memory module to store the portion of the write data received by the memory module further comprises a step of operating the memory module to transfer each one of the plurality of subportions of the write data block from the buffer to the random access memory.

22. A method for transmitting data to a plurality of memory modules in a memory system and interleaving a read operation with a write operation on a bus in the memory system, the bus, having a bus cycle time, is coupled to the plurality of memory modules, comprising the steps of:
(a) operating a first one of the plurality of memory modules to receive a portion of a write data block on the bus;
(b) operating the first one of the plurality of memory modules to not receive a further portion of the write data block for a preselected number of bus cycle times;
(c) operating the first one of the plurality of memory modules to store the portion of the write data block received by the first one of the plurality of memory modules;
(d) operating a second one of the plurality of memory modules to receive any pending read commands on the bus during the preselected number of bus cycle times pause; and
(e) repeating steps (a), (b), (c) and (d) until the write data block has been stored by the first one of the plurality of memory modules.

23. A method for transmitting data to a plurality of memory modules in a computer system and interleaving a read operation with a write operation on a second bus in the computer system, the second bus having a second bus cycle time, the computer system comprises a central processing unit, a memory control logic device having storage means, a first bus, the plurality of memory modules and the second bus, the first bus intercoupling the central processing unit and the memory control logic device, the second bus intercoupling the memory control logic device and the plurality of memory modules, comprising the steps of:
(a) operating the central processing unit to transmit a write command and a write data block over the first bus from the central processing unit to the memory control logic device;
(b) operating the memory control logic device to transmit a portion of the write data block over the second bus from the memory control logic device to a first one of the plurality of memory modules;
(c) operating the memory control logic device to pause a preselected number of second bus cycle times;
(d) operating the first one of the plurality of the memory modules to store the portion of the write data block received by the first one of the plurality of memory modules;
(e) operating the memory control logic device to transmit any pending read commands on the second bus during the preselected number of second bus cycle times pause from the memory control logic device to a second one of the plurality of memory modules; and
(f) repeating steps (b), (c), (d) and (e) until the write data block has been stored by the first one of the plurality of memory modules.

24. The method according to claim 23 further comprising a step of operating the memory control logic device to decode the write command received from the central processing unit over the first bus by the memory control logic device prior to the step of operating the memory control logic device to transmit a portion of a write data block from the memory control logic device.

25. The method according to claim 24 wherein the step of operating the memory control logic device to transmit a portion of a write data block further comprises a step of operating the memory control logic device to transmit the portion of the write data block in a plurality of subportions of write data on the second bus, one of the plurality of subportions of write data per second bus cycle time, from the memory control logic device to the first one of the plurality of memory modules.

26. The method according to claim 25 wherein the step of operating the memory control logic device to transmit a portion of a write data block further comprises a step of operating the memory control logic device to enable a counter in the memory control logic device used by the memory control logic device to control the transmission of the plurality of subportions of write data on the second bus from the memory control logic device to the first one of the plurality of memory modules.

27. The method according to claim 26 wherein the step of operating the memory control logic device to pause for a preselected number of second bus cycle times further comprises a step of operating the memory control logic device to disable the counter in the memory control logic device used by the memory control logic device to control the transmission of the plurality of subportions of write data on the second bus from the memory control logic device to the first one of the plurality of memory modules for the preselected number of second bus cycle times.

28. The method according to claim 27 further comprising a step of operating the memory control logic device to reenable the counter in the memory control logic device used by the memory control logic device to control the transmission of the plurality of subportions of write data on the second bus from the memory control logic device to the first one of the plurality of memory modules prior to repeating the step (b), (c), (d) and (e).

29. The method according to claim 25 wherein the step of operating the memory control logic device to transmit a portion of a write data block from the memory control logic device further comprises a step of operating the memory control logic device to include a second bus write command in a first portion of the subportions of the write data block transmitted from the memory control logic device over the second bus to the first one of the plurality of memory modules.

30. The method according to claim 29 wherein the step of operating the memory module to store the portion of the write data block in the first one of the plurality of memory modules further comprises a step of operating the memory module to decode the bus write command included in the first portion of the subportions of the write data block transmitted from the memory control logic device over the second bus to the first one of the plurality of memory modules.

31. The method according to claims 23, 24 or 25 wherein each one of the plurality of memory modules has a buffer and a random access memory, further comprising a step of operating the first one of the plurality of memory modules to capture each one of the plurality of subportions of the write data block in the buffer of the first one of the plurality of memory modules after the step of operating the memory control logic device to transmit the subportion of a write data block on the bus from the memory control logic device to the first one of the plurality of memory modules.

32. The method according to claim 31 wherein the step of operating the first one of the plurality of memory modules to store the portion of the write data received by the first one of the plurality of memory modules further comprises a step of operating the first one of the plurality of memory modules to transfer each one of the plurality of subportions of the write data block from the buffer to the random access memory of the first one of the plurality of memory modules.

33. A computer system comprising:
 (a) a bus having a bus cycle time;
 (b) a memory control logic device coupled to the bus, the memory control logic device comprising:
  (i) a write buffer having a plurality of locations, each having an address,
  (ii) a multiplexer having a plurality of data inputs, control inputs and an output, the control inputs select one of the plurality of multiplexer inputs to be coupled to the output of the multiplexer, and
  (iii) a control logic section;
 (c) the plurality of multiplexer inputs coupled to outputs of the write buffer, each one of the outputs corresponds to a subportion of a write data block, the multiplexer transmits one of the plurality of subportions of the write data block stored in the write buffer on the bus during at least one bus cycle time;
 (d) the control logic section having outputs coupled to the control inputs of the multiplexer, the control logic section deselects the output of the multiplexer for a preselected number of bus cycle times;
 (e) the control logic section further transmits any pending read commands on the bus during the preselected number of bus cycle times the output of the multiplexer is deselected.

34. The computer system of claim 33 further comprising a memory module coupled to the bus in such a manner to receive and store the subportions of the write data block transmitted on the bus until the write data block is stored in the memory module.

35. The memory module of claim 34 further comprising a buffer, which captures the subportions of the write data block transmitted on the bus.

36. The memory module of claim 35 further includes a random access memory, which stores the subportions of the write data block captured in the buffer.

37. A computer system comprising:
 (a) a bus having a bus cycle time;
 (b) a memory control logic device coupled to the bus, the memory control logic device comprising:
  (i) a write buffer having inputs, outputs, and a plurality of locations, each one of the plurality of locations having an address, and
  (ii) a multiplexer having a plurality of data inputs, control inputs and an output, the control inputs select one of the plurality of multiplexer inputs to be coupled to the output of the multiplexer, and
  (iii) a control logic section;
 (c) the plurality of multiplexer inputs coupled to the outputs of the write buffer, each one of the outputs of the write buffer corresponds to a subportion of a write data block, the multiplexer transmits one of a plurality of subportions of the write data block stored in the write buffer on the bus during at least one bus cycle time;
 (d) the control logic section having outputs coupled to the control inputs of the multiplexer, the control logic section deselects the output of the multiplexer for a preselected number of bus cycle times;
 (e) the control logic section further transmits any pending read commands during the preselected number of bus cycle times the output of the multiplexer is deselected; and
 (f) a memory module coupled to the bus, the memory module comprising:
  (i) a buffer having inputs and outputs, the inputs of the buffer being coupled to the bus, the buffer captures the subportions of the write data block transmitted on the bus, and
  (ii) a random access memory device having inputs and outputs coupled to the buffer outputs, the device stores the subportions of the write data block captured in the buffer.

38. A computer system comprising:
 (a) a first bus;
 (b) a central processing unit coupled to the first bus, the central processing unit transmits a write command and a write data block on the first bus;
 (c) a second bus having a second bus cycle time;
 (d) a memory control logic device coupled to the first bus and the second bus, receives the write command and write data block from the first bus, the memory control logic device comprising:
  (i) a write buffer having inputs, outputs, and a plurality of locations, each having an address, and (ii) a multiplexer having a plurality of data inputs, control inputs and an output, the control inputs select one of the plurality of multiplexer inputs to be coupled to the output of the multiplexer, and (iii) a control logic section;

(e) the plurality of multiplexer inputs coupled to the outputs of the write buffer, each one of the outputs corresponds to a subportion of a write data block stored in the write buffer, the multiplexer transmits a plurality of subportions of the write data block stored in the write buffer on the second bus during at least one second bus cycle time;

(f) the control logic section having outputs coupled to the control inputs of the multiplexer, the control logic section deselects the output of the multiplexer for a preselected number of second bus cycle times;

(g) the control logic section further transmits a read command over the second bus during the preselected number of second bus cycle times the output of the multiplexer is deselected.

39. The computer system of claim 38 further comprising a memory module coupled to the second bus in such a manner to receive and store the subportions of the write data block transmitted on the bus until the write data block is stored in the memory module.

40. The memory module of claim 39 further comprising a buffer, which captures the subportions of the write data block transmitted on the bus.

41. The memory module of claim 40 further includes a random access memory, which stores the subportions of the write data block captured in the buffer.

42. A computer system comprising:

(a) a first bus;

(b) a central processing unit coupled to the first bus, the central processing unit transmits a write command and a write data block on the first bus;

(c) a second bus having a second bus cycle time;

(d) a memory control logic device coupled to the first bus and the second bus, the memory control logic device receives the write command and write data block from the first bus, the memory control logic device comprising:

(i) a write buffer having outputs and a plurality of locations, each of the plurality of locations having an address, and (ii) a multiplexer having a plurality of data inputs, control inputs and an output, the control inputs select one of the plurality of multiplexer inputs to be coupled to the output of the multiplexer, and (iii) a control logic section;

(e) the plurality of multiplexer inputs coupled to the outputs of the write buffer, each one of the outputs corresponds to a subportion of a write data block stored in the write buffer, the multiplexer transmits a plurality of subportions of the write data block stored in the write buffer on the second bus during at least one second bus cycle time;

(f) the control logic section having outputs coupled to the control inputs of the multiplexer, the control logic section deselects the output of the multiplexer for a preselected number of second bus cycle times;

(g) the control logic section further transmits a read command on the second bus during the preselected number of second bus cycle times the output of the multiplexer is deselected; and (h) a memory module coupled to the bus, the memory module comprising:

(i) a buffer having inputs and outputs, the inputs of the buffer being coupled to the bus, the buffer captures the subportions of the write data block transmitted on the bus, and (ii) a random access memory device having inputs and outputs coupled to the buffer outputs, the device stores the subportions of the write data block captured in the buffer.

43. A computer system comprising:

(a) a bus having a bus cycle time;

(b) a memory control logic device coupled to the bus, the memory control logic device comprising a buffer having a plurality of locations, data inputs, control inputs, and data outputs, having a write data block stored in the plurality of locations, and buffer control logic, the outputs of the buffer being coupled to the bus and outputs of the buffer control logic being coupled to the control inputs of the buffer;

(c) the buffer control logic providing outputs to the buffer causing the buffer to transmit the write data block on the bus in a plurality of data bursts interspaced by a preselected number of bus cycle times.

44. The computer system of claim 43 further comprising a memory module coupled to the bus in such a manner to receive and store the plurality of data bursts transmitted on the bus.

45. The memory module of claim 44 further comprising a buffer, which captures the plurality of data bursts transmitted on the bus.

46. The memory module of claim 45 further includes a random access memory device, which stores the plurality of data bursts captured in the buffer.

47. A computer system comprising:

(a) a bus having a bus cycle time;

(b) a memory control logic device coupled to the bus, the memory control logic device comprising a buffer, the buffer having a plurality of locations, data inputs, control inputs and outputs, the memory control logic device also having a write data block stored in the plurality of locations, and buffer control logic, the outputs of the buffer being coupled to the bus and outputs of the buffer control logic being coupled to the control inputs of the buffer;

(c) the buffer control logic providing outputs to the buffer causing the buffer to transmit the write data block on the bus in a plurality of data bursts interspaced by a preselected number of bus cycle times;

(d) a memory module coupled to the bus, comprising:

(i) a buffer having inputs and outputs, the inputs being coupled to the bus, the buffer captures the plurality of data bursts from the bus, and (ii) a random access memory device having inputs and outputs coupled to the outputs of the buffer, the device stores the plurality of data bursts captured by the buffer.

48. A computer system comprising:

(a) a first bus;

(b) a central processing unit coupled to the bus transmits a write command and a write data block on the first bus;

(c) a second bus having a second bus cycle time;

(d) a memory control logic device coupled to the first bus and the second bus, the memory control logic device comprising a buffer having data inputs, control inputs and outputs, and buffer control logic having inputs and outputs, the data inputs of the buffer being coupled to the first bus and outputs of the buffer being coupled to the second bus, an output of the buffer control logic being coupled to control inputs of the buffer;

(e) the buffer receives the write data block from the first bus;

(f) the buffer control logic providing outputs to the buffer causing the buffer to transmit the write data block on the second bus in a plurality of data bursts interspaced by a preselected number of second bus cycle times.

49. The computer system of claim 48 further comprising a memory module coupled to the second bus in such a manner to receive and store the plurality of data bursts transmitted on the second bus.

50. The memory module of claim 49 further comprising a buffer, which captures the plurality of data bursts transmitted on the second bus.

51. The memory module of claim 50 further includes a random access memory, which stores the plurality of data bursts captured in the buffer.

52. A computer system comprising:

(a) a first bus;

(b) a central processing unit coupled to the bus, the central processing unit transmits a write command and a write data block on the first bus;

(c) a second bus having a second bus cycle time;

(d) a memory control logic device coupled to the first bus and the second bus, the memory control logic device comprising a buffer having data inputs, control inputs and outputs, and buffer control logic having inputs and outputs, the data inputs of the buffer being coupled to the first bus and outputs of the buffer being coupled to the second bus, an output of the buffer control logic being coupled to control inputs of the buffer;

(e) the buffer receives the write data block from the first bus;

(f) the buffer control logic providing outputs to the buffer causing the buffer to transmit the write data block on the second bus in a plurality of data bursts interspaced by a preselected number of second bus cycle times;

(g) a memory module coupled to the bus, comprising:

(i) a buffer having inputs and outputs, the inputs being coupled to the bus, the buffer captures the plurality of data bursts from the bus, and (ii) a random access memory device having inputs and outputs coupled to the outputs of the buffer, the device stores the plurality of data bursts captured by the buffer.

53. A memory module comprising:

(a) a random access memory device having inputs and outputs;

(b) a control logic device having inputs and outputs, the inputs coupled to a bus having a bus cycle time, the outputs being coupled to the random access memory device;

(c) the control logic device providing outputs to the random access memory device causing the random access memory device to store a block of data transmitted on the bus in a plurality of data bursts interspaced by a preselected number of bus cycle times.

54. The memory module according to claim 53 wherein the control logic device comprises:

(a) a state machine having inputs coupled to the bus to receive the plurality of data bursts and outputs coupled to the random access memory device;

(b) a command decoder having inputs coupled to the outputs of the state machine, and outputs coupled to the random access memory device in such a manner to cause the random access memory device to store the plurality of data bursts received by the state machine.

55. The memory module according to claim 54 further comprising a second state machine having inputs coupled to the first state machine to receive a portion of each one of the plurality of data bursts and outputs coupled to the control logic device for enabling the control logic device to provide outputs to cause the random access memory device to store the plurality of data bursts.

56. A memory module comprising:

(a) a bus having a cycle time;

(b) a random access memory device having data inputs and outputs and control inputs;

(c) a first state machine coupled to the bus in such a manner for receiving data;

(d) a bidirectional logic device having two sets of inputs and outputs and control inputs, intercoupling the first state machine and the random access memory device, having inputs of a first set of the inputs and outputs coupled to the first state machine, having outputs of the first set of inputs and outputs coupled to the bus in such a manner as to store data received from the first state machine and the random access memory device and a second set of inputs and outputs coupled to the random access memory device in such a manner as to store data from the random access memory device;

(e) a control logic device having outputs coupled to the control inputs of the random access memory device and the bidirectional logic device, the control logic device controlling the bidirectional logic device to store a block of data transmitted in a plurality of data bursts interspaced by a preselected number of bus cycle times;

(f) the control logic device providing outputs to the random access memory device causing the random access memory device to store the plurality of data bursts in the random access memory device.

57. The memory module according to claim 56 further comprising a second state machine having inputs coupled to the first state machine to receive a portion of each one of the plurality of data bursts and outputs coupled to the control logic device for enabling the control logic device to provide outputs to cause the random access memory device to store the plurality of data bursts.

58. The control logic device according to claim 57 further comprising a command decoder having inputs coupled to the outputs of the first and second state machines, and outputs coupled to the random access memory device in such a manner to cause the random access memory device to store the plurality of data bursts received by the state machine device.

59. A memory module comprising:

(a) a bus having a cycle time;

(b) a random access memory device having data inputs and outputs and control inputs;

(c) a first state machine coupled to the bus to receive data;

(d) a bidirectional logic device having two sets of inputs, two sets of outputs, and control inputs, the bidirectional logic device intercoupling the first state machine and the random access memory device, having inputs of a first set of the inputs and outputs coupled to the first state machine, having outputs of the first set of inputs and outputs coupled to the bus to store data received from the first state machine and the random access memory device and a second set of inputs and outputs coupled to the random access memory device to store data from the random access memory device;

(e) a control logic device having outputs coupled to the control inputs of the random access memory device and the bidirectional logic device, the control logic device controlling the bidirectional logic device to store a block of data transmitted in a plurality of data bursts interspaced by a preselected number of bus cycle times;

(f) the control logic device providing outputs to the random access memory device causing the random access memory device to store the plurality of data bursts in the random access memory device.

* * * * *